(12) United States Patent
Muller et al.

(10) Patent No.: US 7,295,103 B2
(45) Date of Patent: Nov. 13, 2007

(54) INTEGRATED SENSOR SYSTEM AND METHOD FOR A FARM TIRE

(75) Inventors: Eric Michel Paul Muller, Contz-les-Bains (FR); Gregory William Camarato, North Royalton, OH (US); Brian Matthew Logan, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 210 days.

(21) Appl. No.: 11/021,653

(22) Filed: Dec. 22, 2004

(65) Prior Publication Data

US 2006/0145828 A1    Jul. 6, 2006

(51) Int. Cl.
*B60C 23/00* (2006.01)
(52) U.S. Cl. .................. 340/443; 340/442; 340/466; 340/467; 73/146.5; 701/93
(58) Field of Classification Search ............... 340/443, 340/441, 442, 444, 445, 466, 467; 701/93, 701/99, 146.5; 73/146.5
See application file for complete search history.

(56) References Cited

U.S. PATENT DOCUMENTS

| | | | |
|---|---|---|---|
| 6,144,295 A * | 11/2000 | Adams et al. | 340/442 |
| 6,434,470 B1 * | 8/2002 | Nantz et al. | 701/93 |
| 6,604,040 B2 * | 8/2003 | Kawasaki et al. | 701/80 |
| 6,604,416 B2 * | 8/2003 | Tsujita | 73/146.5 |
| 7,034,672 B2 * | 4/2006 | Dinello et al. | 340/447 |

\* cited by examiner

*Primary Examiner*—Davetta W. Goins
(74) *Attorney, Agent, or Firm*—Richard B. O'Planick

(57) ABSTRACT

An integrated tire monitoring system for an agricultural vehicle control system comprises at lease one sensor integrally coupled to at least one tire on a farm vehicle; an external reader for obtaining tire revolution speed data from the sensor during each revolution of the tire; input means for delivering the tire revolution speed data to a vehicle control unit, the vehicle control unit calculating vehicle speed based on the inputted tire revolution speed data and outputting at least one control signal. The reader may input tire pressure data from the sensor into the vehicle control unit for the calculation of pressure adjusted vehicle speed. The sensor may store tire specific identification data accessible by the external reader and one or more control signals from the vehicle ECU may be used to control speed between a plurality of vehicle wheels; engine speed; wheel slippage; and/or tire air pressure. The vehicle control unit may further evaluate work efficacy of the vehicle based upon the calculated vehicle speed and communicate display data of the results to an operator of the vehicle.

11 Claims, 2 Drawing Sheets

ECU INPUTS/OUTPUTS

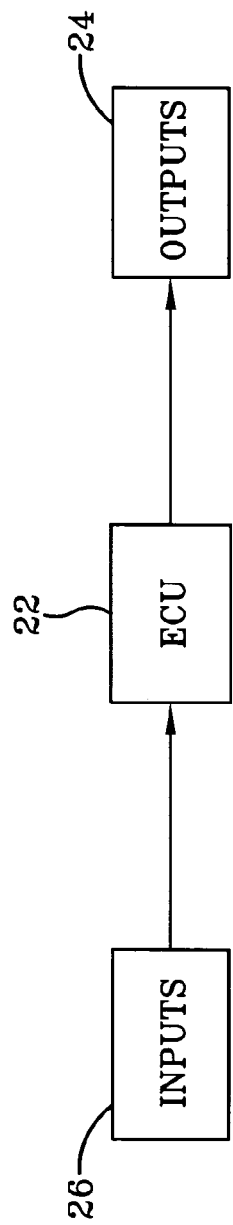

- TRUE TIRE CHARACTERISTICS @ INFLATION PRESSURES
- INFLATION
- CALCULATED REVOLUTIONS PER MILE
- ENGINE SPEED
- GROUND SPEED/RADAR IF AVAILABLE
- REVOLUTIONS OF EACH TIRE

- SPEED DIFFERENCE FRONT-TO-REAR
- ENGINE CONTROL
- WHEEL SLIP
- ESTIMATED SPEED
- CONTROL CTIS IF AVAILABLE
- ADJUST PRESSURE FOR MAX TRACTION (IF CTIS)
- CONTROL WHEEL SLIP
- DETERMINE WORK EFFECTIVENESS (DASH DISPLAYS)

FIG-2

INTEGRATED SENSOR SYSTEM AND METHOD FOR A FARM TIRE

FIELD OF THE INVENTION

The present invention relates to a system and method of measuring a pneumatic tire condition and, more particularly to an integral system and method of measuring a farm tire condition and utilizing the measured condition in a plurality of applications.

BACKGROUND OF THE INVENTION

The present invention relates to monitoring one or more conditions of pneumatic tires mounted on wheels. As a rotary element, a tire's angular position, rotational (angular) velocity and acceleration, rate of change of acceleration, and revolution count are important in determining such things as vehicle and/or tire instantaneous position, speed, mileage, acceleration and braking, slip/skid, and are also factors in the wear of the tire.

In addition to rotational/angular characteristics, other important characteristics to be monitored in a pneumatic tire are pneumatic pressure and temperature. Pressure (pneumatic pressure) is well known as a critical factor in pneumatic tire operation, most importantly if there is a loss of sufficient pressure to safely operate the tire, e.g., a "flat tire". The (pneumatic) temperature is generally of secondary importance. Although it can be used to indicate an average temperature of the tire and wheel surrounding the pneumatic cavity, temperature is mostly used to normalize a pressure measured in a hot tire to a "cold pressure" value, i.e., the pressure as it would be in a "cold" tire.

A great deal of prior art is devoted to apparatus and methods for measuring and monitoring pneumatic tire conditions. U.S. Pat. No. 3,665,387 discloses a low tire pressure warning system adaptable for any number of wheels of a vehicle and providing dashboard indications of system operation and low pressure conditions while the vehicle is in motion.

U.S. Pat. No. 4,911,217 discloses an RF transponder in a pneumatic tire. FIG. 1a of this patent illustrates a prior-art tire identification system ("reader") that can be used to interrogate and power the transponder within the tire. U.S. Pat. No. 5,181,975 discloses a pneumatic tire having an integrated circuit (IC) transponder and pressure transducer. As described in this patent, in a tire that has already been manufactured, the transponder may be attached to an inner surface of the tire by means of a tire patch or other similar material or device.

Dynamic conditions such as position and angular velocity of a rotary element are readily measured. Straightforward tire revolution counters are well known, represented by way of example in U.S. Pat. Nos. 4,842,486 and 5,524,034. U.S. Pat. No. 5,218,862 discloses a tire pressure monitor comprising wheel speed sensors located at the vehicle's wheels to convey wheel speed information to an electronic controller. This patent notes that the wheel speed discrepancy between one tire to the others indicates the relative tire pressure, but that discrepancy may also be indicative of the vehicle turning, accelerating or decelerating, going up or down steep grades, or of one wheel slipping, or of a cross wind bearing on the vehicle.

From the foregoing, it is thus known to put transponders (and associated sensors) in pneumatic tires of motor vehicles. These transponders transmit a RF wave, with or without variable data (e.g., tire pressure, temperature, position) and/or fixed data (e.g., tire ID) to outside the tire, and receive RF signals, with or without data, from outside the tire. A separate transponder is typically associated with each tire of a motor vehicle to monitor and transmit tire-related data. Typically, an "interrogator" having both transmitting and receiving capabilities is used to communicate with the transponders.

Such systems heretofore have been implemented primarily in passenger vehicle applications for the purpose of monitoring tire conditions such as pressure and temperature and communicating such information to the vehicle operator. Safety has been a primary consideration in such implementations. Application of such systems in tires for farm or agricultural vehicles has not, however, generally occurred. Accordingly, heretofore little attention and emphasis has been placed on creating expanded applications using pneumatic tire information generated from the implementation of tire monitoring systems in a farm tire.

In farm vehicle applications, certain systems for measuring tire rotational speed have been applied as inputs to the vehicle's electronic control unit, typically a microprocessor. Such speed measuring systems are radar systems that are expensive to implement and maintain and cannot be used for other purposes such as storage of new tire information or for measuring tire parameters such as air pressure and temperature. There remains, therefore, a need in the industry for an inexpensive means for providing inputs to engine management systems that may be used for myriad agriculture applications. Moreover, such a system should be flexible and provide means for the storage of new tire information and for measuring other tire parameters such as air pressure and temperature. Still further, an ideal solution to the needs of the industry can be capable of use by OEM's as a main input directly into a vehicle's electronic control unit and be capable of use by a tire maker to store relevant information about the tire such as its Date Code, tire specification; and a tire identification tied to tire uniformity.

SUMMARY OF THE INVENTION

Pursuant to one aspect of the invention, an integrated tire monitoring system for an agricultural vehicle control system comprises a sensor integrally coupled to at least one tire on a farm vehicle; an external reader for obtaining tire revolution speed data from the sensor during each revolution of the tire; input means for delivering the tire revolution speed data to a vehicle control unit, the vehicle control unit calculating vehicle speed based on the inputted tire revolution speed data and outputting at least one control signal.

Pursuant to another aspect of the invention, the sensor measures pneumatic pressure within the vehicle tire; the reader obtains tire pressure data from the sensor and inputs the tire pressure data into the vehicle control unit; and the vehicle control unit utilizes the inputted tire pressure data to calculate a pressure adjusted vehicle speed.

Pursuant to yet another aspect of the invention, the sensor may store tire specific identification data accessible by the external reader.

According to another aspect of the invention, the control signal may be used to control a vehicle parameter selected from the group [adjustment of speed between a plurality of vehicle wheels; engine speed; wheel slippage; tire air pressure]. The vehicle control unit may further evaluate work efficacy of the vehicle based upon the calculated vehicle speed and communicate results of the evaluation of work efficacy to an operator of the vehicle.

Another aspect of the invention is for a method of integrating a tire monitoring system into a farm vehicle control system comprising the steps: coupling a sensor integrally into at least one tire on a farm vehicle; obtaining tire revolution speed data from the sensor by means of an external reader during each revolution of the tire; inputting tire revolution speed data into a vehicle control unit; calculating vehicle speed based on inputted tire revolution speed data; and outputting a control signal from the vehicle control unit based upon the calculated vehicle speed.

Other aspects, features and advantages of the invention will become apparent in light of the following drawings and specification.

BRIEF DESCRIPTION OF THE DRAWINGS

The invention will be described by way of example and with reference to the accompanying drawings in which:

FIG. 2 is a schematic representation showing ECU inputs and outputs in a system configured pursuant to the invention.

DETAILED DESCRIPTION OF THE INVENTION

Figure 1:
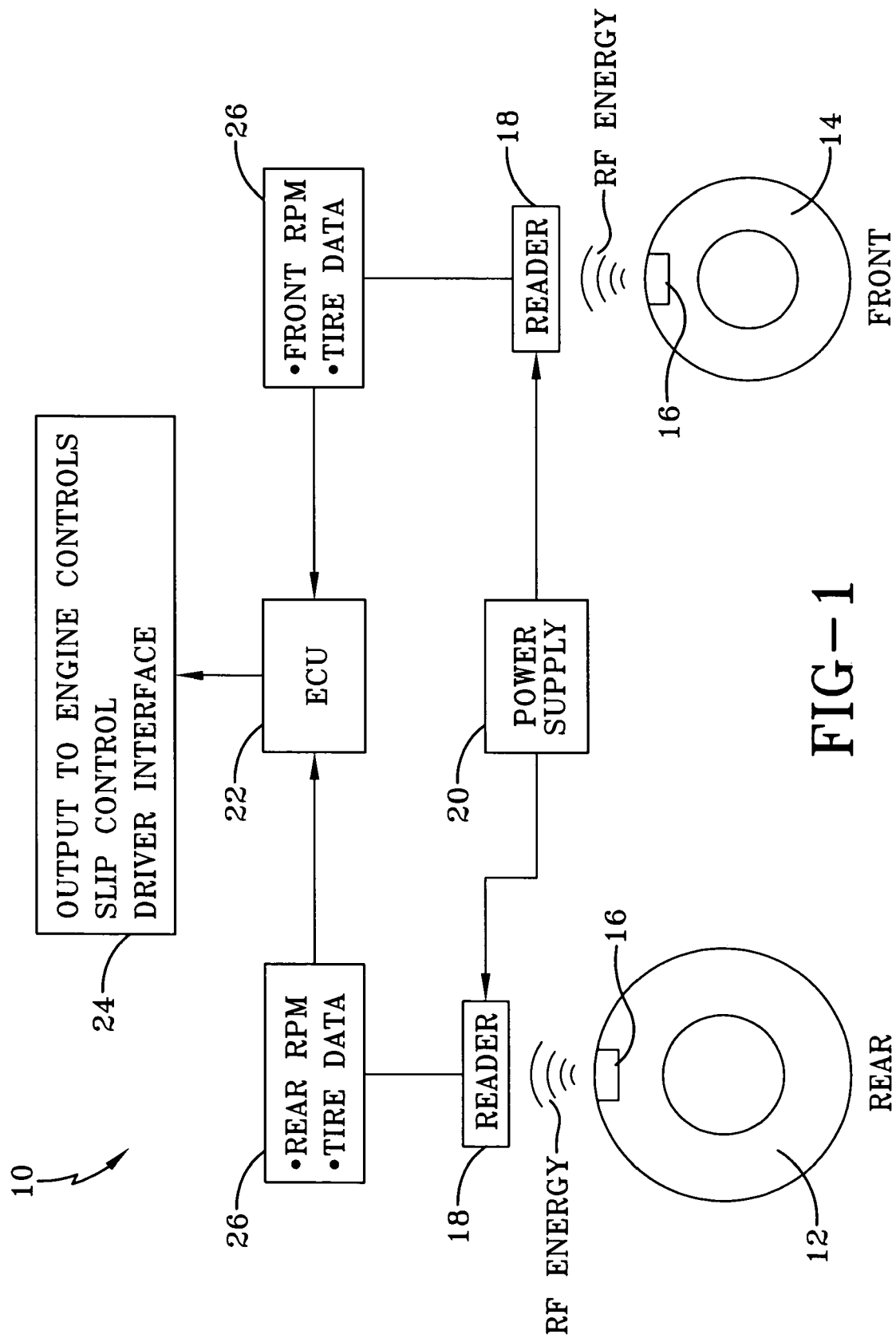
FIG. 1 is a schematic representation of an integrated sensor system for farm tires configured pursuant to the invention.

With reference to FIGS. 1 and 2, an integrated tire monitoring system 10 for an agricultural vehicle is represented in schematic form. As used herein, "agriculture", "agricultural", "farm", are used interchangeably in a non-limiting manner. Such references are to a broad range of applications and wheeled apparatus that operate primarily off-road on unpaved surfaces. Such applications include but are not intended to be limited to: construction site equipment such as tractors and earth moving equipment; and farm related equipment such as tractors, combines, wagons, earth conditioning equipment, etc. Equipment used in all such applications operates on wheeled frames having a pneumatic tire mounted to each wheel. In addition, modern equipment of the type referred to herein generically as "farm" or "agricultural" include either directly or indirectly an engine driven vehicle typically controlled by an electronic control unit (ECU) such as a microprocessor.

Represented in FIG. 1 is a schematic of a vehicle such as a farm tractor having a larger rearward wheel 12 and a smaller diameter front wheel 14. One or both wheels 12, 14 may be engine driven and its speed controlled by a vehicle ECU or other control means. Pursuant to the invention, a sensor or transponder 16 is affixed or otherwise incorporated into a tire mounted on each wheel 12, 14. The invention is not intended to be hardware limited and any known sensor or transducer may be employed that meets the functional requirements of the system. By way of example, the sensor and communication devices and systems identified above and incorporated herein by reference can functionally suffice. Other known sensor types and configurations may also be employed within the contemplation of the invention if so desired. Mounted fixedly to each tire on wheels 12, 14, the sensor 16 rotates in unison with the tire. A single sensor 16 may be deployed as shown or, if desired, multiple sensors may be utilized as a fail-safe. Multiple sensors will allow the system to function even if one or more sensors fail. The sensor 16 may be self-powered such as by battery or be energized by means of a radio frequency signal as discussed above. Associated with each sensor 16 (not shown) typically is an antenna through which the sensor may communicate with a respective reader 18.

Each reader 18 is powered by a system power supply 20 and is mounted remotely from a respective sensor 16 typically at a fixed location on the vehicle body or frame. Known readers may be employed for such a purpose. As each sensor 16 rotates, it is brought into a suitably proximal relationship to a respective reader 18 to enable communication between the sensor and its associate reader. Communication between each sensor and its respective reader may be by radio frequency transmission or other transmitting frequencies. It will be appreciated by those skilled in the art that sensor 16 may comprise a pressure transducer that measures the pneumatic pressure within the tire cavity and transmits data to reader 18. Moreover, pursuant to the invention, the transducer/sensor 16 may comprise memory storage capability whereby tire specific identification data may be retained. The reader 18 may thus be programmed to read tire pressure and tire identification data from the transducer/sensor at regular or intermittent periods. Pursuant to the invention, the reader 18 may be programmed to count each revolution of an associate tire from communication with the sensor 16, whereby the rotational speed may be discerned. Other sensors may be incorporated by which other parameters such as tire air temperature can be measured and transmitted as data to reader 18 if so desired.

An agricultural or farm vehicle is typically engine driven under the control of a computer commonly referred to as an electronic control unit (ECU) 22. The reader 18 may be wired as an input into the vehicle ECU 22 to transmit input data 26 relating to measured tire rotational rpm speed; tire identification information; and/or information indicating tire pneumatic pressure, temperature or other measured parameters. An algorithm in the ECU can determine the vehicle speed based on the tire revolutions per kilometer. With the input of tire pressure data from reader 18 obtained from sensor 16, the algorithm may take into account the effect of tire pressure on vehicle speed.

In adjusting revolutions per kilometer by tire air pressure data, the ECU algorithm thus provides an accurate indication of vehicle speed and tire status. With this information, a number of useful applications may be served such as a calculation of the footprint length of each tire; the work efficacy of the vehicle derived from engine speed, traction of each tire, load, and vehicle speed. A wheel to wheel footprint and speed comparison by the ECU may further be used to analyze tire slippage and facilitate slippage elimination.

One or more control signals may be generated by the ECU as a result of the data processing referenced above. Such outputs 24 may function to adjust engine controls whereby controlling tire/wheel speed and eliminating slippage; or communicate display data such as measured tire parameters and/or vehicle work efficacy to the vehicle operator. Slippage may be controlled to optimum levels for a given field condition. Work efficacy may thus be enhanced in informing the vehicle driver of traction, load, and speed data. Moreover, the sensor 16 may be used to control an on-board tire pressure management, such as a central tire inflation system (CTIS). A CTIS in agricultural or farm vehicles is configured to provide pressurized air to each tire automatically.

FIG. 2 shows the subject system as ECU Inputs and Outputs. As discussed above, the inputs into the ECU 22 may be true tire characteristic at inflation pressures; tire inflation, numerical revolutions, and revolutions per mile or kilometer. Other vehicle information such as engine speed and measured ground speed (such as determined by radar or other means) may further be inputted into the ECU and used for comparison against algorithm generated results. Output signals from the ECU may be used to adjust speed differential between wheels/tires; control engine operation; adjust or eliminate wheel slippage; control CTIS operation to adjust pressure for maximum traction; and/or communicate information relating to work efficacy and vehicle speed to the vehicle operator.

From the forgoing, it will be appreciated that the subject invention can be used by original equipment manufacturers as the main input into their vehicle speed measurement and engine management systems. The invention may be used by the tire manufacturer to obtain relevant information about each tire that can be stored during manufacture such as Date Code, tire specification, and unique tire ID that is tied to the tire's uniformity as produced. Such tire specific data will be accessible by the vehicle ECU via reader 16 and the tire specific data for replacement tires may be readily compared to the tire specifications of the original tires.

It will further be noted that the subject invention is not hardware or software dependent. Relatively inexpensive sensors and readers that are commercially available in sundry form and configuration may be used. The subject system can thus inexpensively provide inputs to engine management systems that currently must rely on expensive radar systems for speed indication. The tire sensor/transponder can provide the same information, plus pressure measurement and storage of new tire information if desired.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which would be within the full intended scope of the invention as defined by the following appended claims.

What is claimed is:

1. An integrated tire monitoring system for a vehicle control system comprising:
    a tire parameter sensor integrally coupled to at least one tire on a farm vehicle;
    an external reader for obtaining tire parameter data from the sensor during each revolution of the tire;
    input means for delivering the tire parameter data to a vehicle control unit, the vehicle control unit calculating an adjusted vehicle speed based on the inputted tire parameter data and outputting at least one vehicle control signal for adjusting at least one vehicle parameter responsive to the calculated adjusted vehicle speed.

2. An integrated tire pressure monitoring system according to claim 1 wherein the tire parameter sensor measures pneumatic pressure within the vehicle tire.

3. An integrated tire pressure monitoring system according to claim 2 wherein the reader obtains tire pressure data from the tire parameter sensor and inputs the tire pressure data into the vehicle control unit and wherein the vehicle control unit utilizes the inputted tire pressure data to calculate a tire pressure adjusted vehicle speed.

4. An integrated tire pressure monitoring system according to claim 1 wherein the tire parameter sensor stores tire specific identification data accessible by the external reader.

5. An integrated tire pressure monitoring system according to claim 1 wherein the tire parameter data comprises tire revolution speed data for a plurality of tires on the vehicle inputted into the vehicle control unit and wherein the vehicle control unit utilizes the inputted tire revolution speed data of the plurality of tires to calculate a tire parameter adjusted vehicle speed; and the vehicle control unit uses the inputted tire revolution speed data for the plurality of tires to generate the control signal to control a vehicle parameter selected from the group: adjustment of speed between a plurality of vehicle wheels; engine speed; wheel slippage; tire air pressure.

6. An integrated tire monitoring system for an agricultural vehicle control system comprising:
    a sensor integrally coupled to at least one tire on a farm vehicle;
    an external reader for obtaining tire revolution speed data from the sensor during a revolution of the tire;
    input means for delivering the tire revolution speed data to a vehicle control unit, the vehicle control unit calculating vehicle speed based on the inputted tire revolution speed data and outputting at least one control signal; and
    wherein the vehicle control unit evaluates work efficacy of the vehicle based upon the calculated vehicle speed and communicates results of the evaluation of work efficacy to an operator of the vehicle.

7. A method of integrating a tire monitoring system into a vehicle control system comprising the steps:
    a. coupling a tire parameter sensor integrally into at least one tire on a farm vehicle;
    b. obtaining tire parameter data from the tire parameter sensor by means of an external reader during each revolution of the tire;
    c. inputting tire parameter data into a vehicle control unit;
    d. calculating an adjusted vehicle speed based on inputted tire parameter data;
    e. outputting a control signal from the vehicle control unit based upon the calculated adjusted vehicle speed; and
    f. controlling at least one vehicle parameter responsive to the calculated adjusted vehicle speed.

8. A method according to claim 7, further comprising the steps:
    measuring tire pressure with the tire parameter sensor;
    obtaining tire pressure data from the tire parameter sensor by operation of the external reader;
    inputting tire pressure data into the vehicle control unit; and
    utilizing the inputted tire pressure data to calculate a pressure adjusted vehicle speed.

9. A method according to claim 7, further comprising the steps:
    storing tire specific identification data in the tire parameter sensor;
    accessing the tire specific identification data by operation of the external reader.

10. A method according to claim 7, further comprising the steps:
    integrating a tire parameter sensor into a plurality of vehicle tires;
    obtaining tire pressure data from each tire parameter sensor;
    inputting the tire pressure data into the vehicle control unit;
    utilizing the inputted tire pressure data to calculate a pressure adjusted vehicle speed; and
    utilizing the pressure adjusted vehicle speed to generate a control signal to control a vehicle parameter selected from the group: adjustment of speed between a plurality of vehicle wheels; engine speed; wheel slippage; tire air pressure.

11. A method of integrating a tire monitoring system into a farm vehicle control system comprising the steps:

a. coupling a tire revolution speed sensor to at least one tire on a farm vehicle;
b. obtaining tire revolution speed data from the sensor by means of an external reader during a revolution of the tire;
c. inputting tire revolution speed data into a vehicle control unit;
d. calculating vehicle speed based on inputted tire revolution speed data;
e. outputting a control signal from the vehicle control unit based upon the calculated vehicle speed;
f. evaluating work efficacy of the vehicle based upon the calculated vehicle speed; and
g. communicating results of the work efficacy evaluation to an operator of the vehicle.

\* \* \* \* \*